April 17, 1928.

G. A. LOUD 1,666,709

CAM MECHANISM FOR ACTUATING VALVES

Filed Aug. 12, 1926      2 Sheets-Sheet 1

Inventor:
George A. Loud,
by Walter E. Lombard.
Atty.

April 17, 1928.  1,666,709
G. A. LOUD
CAM MECHANISM FOR ACTUATING VALVES
Filed Aug. 12, 1926  2 Sheets-Sheet 2
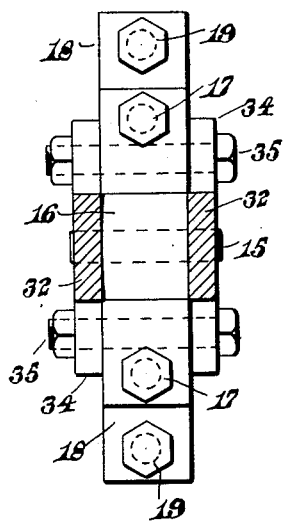
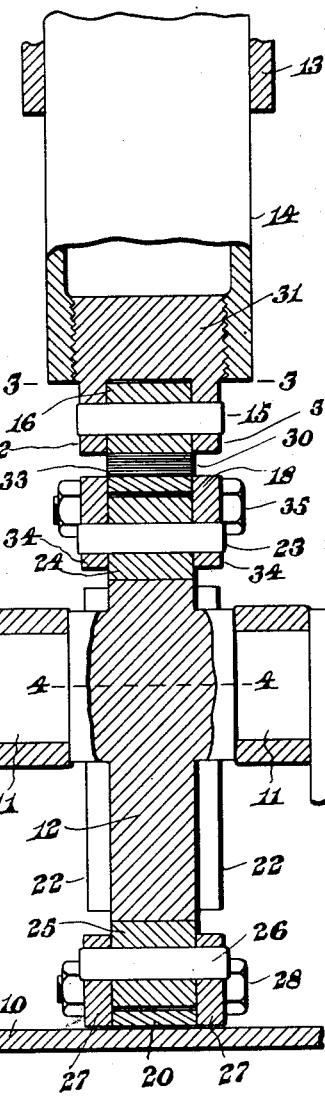
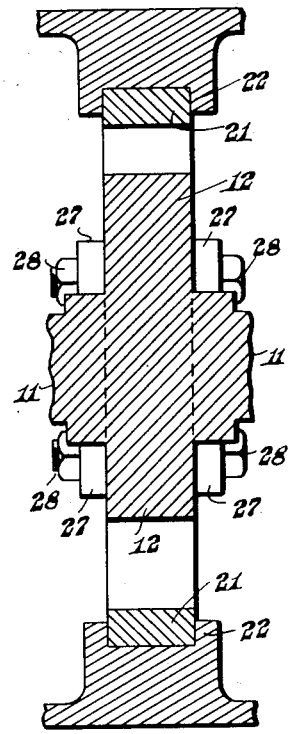
Inventor:
George A. Loud,
by Walter E. Lombard,
Atty.

Patented Apr. 17, 1928.

1,666,709

UNITED STATES PATENT OFFICE.

GEORGE A. LOUD, OF FITCHBURG, MASSACHUSETTS, ASSIGNOR TO LOUD SLIDE VALVE ENGINE CO., OF FITCHBURG, MASSACHUSETTS, A CORPORATION OF MASSACHUSETTS.

CAM MECHANISM FOR ACTUATING VALVES.

Application filed August 12, 1926. Serial No. 128,896.

This invention relates to cam mechanisms for actuating valves and the like and has for its object the production of a simple device of this character which will be positive in its action.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 2 represents a vertical section of same on line 2, 2 on Fig. 1.

Figure 3 represents a horizontal section of same on line 3, 3 on Fig. 2, and

Figure 4 represents a horizontal section of same on line 4, 4 on Fig. 1.

Similar characters indicate like parts throughout the several figures of the drawings.

Figure 1:
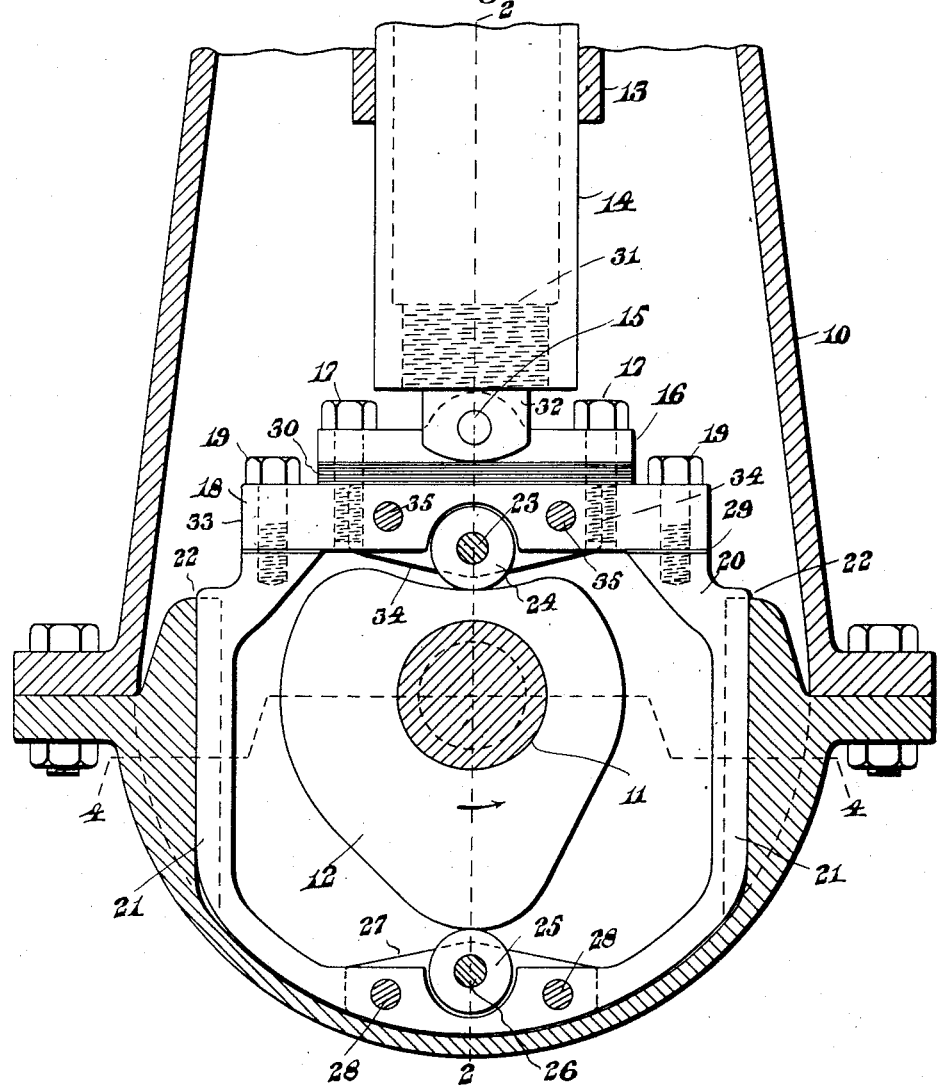
Figure 1 represents a section of a cam mechanism for actuating valves and the like, embodying the principles of the present invention.

In the drawings 10 is the crank casing of an internal combustion engine provided with the usual driving shaft 11 in which is mounted a cam member 12 preferably formed integral therewith.

The shaft rotates in bearings of usual construction and has cranks thereon connected to the reciprocating pistons.

As these features form no part of the present invention it is deemed unnecessary to illustrate the same.

The casing 10 is provided with a bearing 13 in which is adapted to reciprocate a valve rod or other similar member 14.

The upper end of the member 14 is provided with some means for controlling the operation of the valves, but as these features are no part of the present invention, they are not shown in the drawings.

The lower end of the valve rod 14 has pivoted thereto at 15 a block 16. This block 16 is secured by bolts 17 to a bifurcated block 18 which in turn is secured by bolts 19 to a yoke 20.

The yoke 20 has parallel vertical edges 21 which are adapted to reciprocate in guides 22 formed upon the casing 10. These guides 22 insure the reciprocation of the yoke 20 in a direct line and prevent any lateral or side play thereof.

The bifurcated block 18 has pivoted thereto at 23 a roller 24 and oppositely disposed on the yoke 20 is another roller 25 revoluble upon a pin 26 mounted in plates 27 secured by bolts 28 to the opposite sides of the under part of the yoke 20.

The cam member 12 has a plurality of throws therein which will impart the desired movements to the valve rod or member 14.

Both rollers 24—25 always contact with the edge of the cam 12 during the entire rotation of said cam.

Between the bifurcated block 18 and the upper end of the yoke 20 are shims 29 by which the block 18 may be adjusted relative to said yoke 21 in order to separate the rollers 24–25 the required distance apart so that said rollers may move freely on the edge of the cam 12 without binding.

In a like manner a plurality of shims 30 are interposed between the block 16 and the bifurcated block 18 so that the valve rod 14 may be adjusted relatively to the axis of the driving shaft 11, thus providing a means for insuring that the valves will open and close at the proper times.

Preferably the member 14 is hollow as indicated in Fig. 2 and has threaded to its lower end the closure 31 provided with downwardly extending ears 32 in which the pivot pin 15 is mounted.

The bifurcated block 18 is made up of a central portion 33 and side plates 34 which are connected to the central portion 33 by bolts 35.

The side members 34 support the pin 23.

This makes a very simple mechanism for operating the valves of internal combustion engines, the mechanism being provided with all the necessary adjustments to permit the free movement of the rollers along the edge of the cam member 12 and to permit the ports of the valve to open and close at the proper intervals.

It is believed that the operation and many advantages of the invention will be understood without further description.

Having thus described my invention, I claim:

1. The combination of a reciprocating member; a block pivoted to one end thereof; a yoke; a bifurcated block secured to said yoke; bolts connecting said blocks; shims between said bifurcated block and said yoke; a roller disposed in said bifurcated block; a second roller on said yoke alined with the first mentioned roller; a cam between and coacting with both rollers; and a revoluble shaft to which said cam is secured.

2. The combination of a reciprocating valve rod; a casing enclosing said rod closed at the lower end; a cam within said closed lower end; a revoluble shaft for said cam; a block pivotally connected to said valve rod; a U-shaped member surrounding said cam and connected at it upper end to said block; means restricting the movement of said member to a path parallel with said valve rod; a roller on said block coacting with the upper edge of said cam; and another roller on said member coacting with the lower edge of said cam.

3. The combination of a reciprocating valve rod; a casing enclosing said rod closed at the lower end; a cam within said closed lower end; a revoluble shaft for said cam; a block pivotally connected to said valve rod; a U-shaped member surrounding said cam and connected at its upper end to said block; means restricting the movement of said member to a path parallel with said valve rod; a roller on said block coacting with the upper edge of said cam; oppositely disposed plates secured to the lower end of said member; and a second roller rotatably mounted between said plates and coacting with the lower edge of said cam.

Signed by me at 746 Old South Bldg., Boston Mass., this 11th day of August, 1926.

GEORGE A. LOUD.